United States Patent [19]

DeAngelis et al.

[11] 3,987,449

[45] Oct. 19, 1976

[54] ANTENNA WINDSHIELD

[75] Inventors: Willie G. DeAngelis, Brackenridge; Charles R. Coleman, Aspinwall, both of Pa.

[73] Assignee: PPG Industries, Inc., Pittsburgh, Pa.

[22] Filed: Apr. 11, 1975

[21] Appl. No.: 567,225

[52] U.S. Cl. .............................. 343/713; 156/99; 343/873
[51] Int. Cl.² ........................................ H01Q 1/32
[58] Field of Search ........... 343/711, 712, 713, 710, 343/873; 156/99, 104, 105, 106

[56] References Cited
UNITED STATES PATENTS

| | | | |
|---|---|---|---|
| 3,020,376 | 2/1962 | Hofmann | 156/99 |
| 3,414,902 | 12/1968 | Shaw, Jr. | 343/713 |
| 3,579,243 | 5/1971 | Dickason et al. | 343/713 |
| 3,582,419 | 6/1971 | Marchand et al. | 156/99 |
| 3,638,225 | 1/1972 | Zawodniak | 343/713 |

*Primary Examiner*—Alfred E. Smith
*Assistant Examiner*—Tommy P. Chin
*Attorney, Agent, or Firm*—Edward I. Mates

[57] ABSTRACT

An improved and laminated antenna window for vehicles and the like in which antenna wire is embedded in interlayer material and extends out of a surface of the interlayer material into a notched area for attachment to an electroconductive element adapted to be coupled to a radio receiver. A thin layer of a plastic material having a lower deformation temperature than the interlayer material is used in the vicinity of the notched portion to provide a barrier against fluid penetration between the layers of the assembly to be laminated, thereby insuring a product that is acceptable to the customer.

10 Claims, 2 Drawing Figures

ANTENNA WINDSHIELD

BACKGROUND OF THE INVENTION

The present invention relates to laminated windshields and particularly to laminated antenna windshields of the type depicted in U.S. Pat. Nos. 3,543,272 and 3,638,225 to Rodger V. Zawodniak. Such laminated windshields comprise a pair of sheets of relatively rigid material and a plastic interlayer in which is embedded antenna wire. One of the sheets of rigid material has a notched portion along its marginal periphery where an exposed portion of the antenna wire is connected to an electroconductive element. The latter, in turn, is adapted to be coupled to a radio receiver so that the antenna wire embedded within the interlayer of the laminated windows serves as an antenna for the radio.

Typically, laminated automobile windshields are fabricated by bending a pair of glass sheets of matching outline except for a small notched portion along one longitudinal side edge of one of the glass sheets while the latter are aligned on a bending mold, sewing an elongated antenna wire into a sheet of plasticized polyvinyl butyral that serves as an interlayer, assembling the pair of shaped glass sheets with the interlayer sheet therebetween for lamination, prepressing the assembly to remove entrapped air and fluid and seal the glass sheets to the margin of the interlayer and finally laminating the prepressed assembly in an oil autoclave. Adequate sealing of the marginal edge of the assembly during prepressing is vital to provide a barrier to the inward flow of oil between the layers of the assembly during final lamination. Prior to the advent of the antenna windshield, in laminated windshields whose aligned glass sheets had aligned margins uninterrupted by an offset notched portion in one of the sheets, the marginal barrier of interlayer material bonded to the aligned glass margins could be made impervious to the flow of oil between adjacent layers of the assembly during final lamination in an oil autoclave by thickening the marginal portion of the interlayer while still hot from the prepressing step using the edge rolling technique of U.S. Pat. No. 2,999,779 to Morris. However, it is not possible to use edge rolling in the vicinity of the notched portion without danger to the antenna wire.

The notched portion of one of the sheets of rigid transparent material, such as glass sheets, occupies the lower central portion of an automobile windshield when installed in a vehicle. The other glass sheet and the interlayer sheet extend throughout the entire extent of the windshield substantially, thereby providing a notched portion wherein the portion of the antenna wire outside the interlayer sheet can be attached to a metal plate or tab, which, in turn, is connected to a lead wire which leads to a radio receiver or is adapted to be connected to a radio receiver.

During the fabrication of laminated antenna windshields for automobiles, the portion of the antenna wire to be connected to the metal plate or tab must leave the interior of the interlayer sheet. The notched portion of the notched glass sheet is made slightly larger than the tab to be inserted, sufficiently small to avoid too great a deviation in dimensions between the glass sheets, yet large enough to insure that the entire tab can be inserted in the notched portion in spaced relation to the perimeter of the windshield to avoid grounding the tab against the frame of an automobile when the windshield is installed. Since the tab is made as small as possible in order to avoid too much interruption to the transparency of the laminated window, an operator is likely to imbed the antenna wire in the interlayer sheet in such a manner that a portion of the antenna wire extends from the interior of the interlayer sheet a distance from the edge of the sheet greater than the transverse distance of the notched portion of the rigid transparent sheet in which the connection is made to the metal tab. In such a case, the thickness of the antenna wire portion outside the interlayer and misaligned with the notched portion causes a separation between the notched glass sheet and the interlayer sheet in the vicinity of the notched portion.

Even though the assembly of two glass sheets and interlayer sheet is preliminarily pressed or tacked together by either heating and evacuation throughout the margin by the so-called glass bag technique disclosed in U.S. Pat. No. 2,948,645 to Laurence A. Keim, or the glass-plastic assembly is prepressed by roll prepressing apparatus such as that disclosed in U.S. Pat. No. 3,351,001 to Anthony A. Achkio, where the assembly to be prepressed is passed through an oven and heated to approximately 150° F. (approximately 65° C.) and roll pressed at that temperature followed by additional heating to approximately 190° F. (about 88° C), such preliminary pressing has not been able to seal completely the plastic interlayer sheet to the notched glass sheet in the vicinity of the antenna wire when the latter extends out of the interlayer material interior of the notched portion.

An attempt was made to fill this unsealed area by applying additional interlayer material across the interface between the glass and the plastic interlayer occupied by the exposed antenna wire adjacent the inner boundary of the notched portion. However, this proposed solution did not eliminate the problem. When the assembly with its antenna wire was laminated at elevated temperature and pressure in an oil autoclave, some oil penetrated along the wire and extended into the viewing area of the windshield to provide a reject in production.

SUMMARY OF THE INVENTION

The present invention provides novel structure to a laminated antenna window that comprises a pair of relatively rigid sheets of transparent material, such as glass or recognized glass substitutes such as polycarbonate or acrylic plastic, one of which is notched along the marginal portion of one of said sheets to receive an electroconductive element adapted to form part of an antenna circuit, and a thermoplastic interlayer bonding the rigid transparent sheets together throughout substantially their entire extent with an antenna wire embedded in the interlayer and having a portion of said antenna wire extending outward from a major surface of the interlayer in the vicinity of the notched portion. The novel structural element comprises a thin film of a plastic that has a lower heat softening temperature than that of the interlayer and that adheres to both the interlayer and the rigid transparent material disposed in the interfacial region between the rigid sheet and the surface of the interlayer through which the antenna wire extends in the region adjacent the area where the antenna wire extends outside the interlayer. The film of lower heat-softening plastic is applied before the prepressing operation and flows around the exposed antenna wire sufficiently during the prepressing step that precedes the final lamination to form a dam thick enough to prevent further penetration along the length of the antenna wire between the interfacial surfaces of the windshield during the final lamination of the prepressed assembly in an oil autoclave.

BRIEF DESCRIPTION OF THE DRAWING

The present invention will be understood more clearly in the light of a description of an illustrative embodiment which follows.

In the drawings which form part of the description of the illustrative embodiment.

DESCRIPTION OF THE PREFERRED EMBODIMENT

Figure 1:
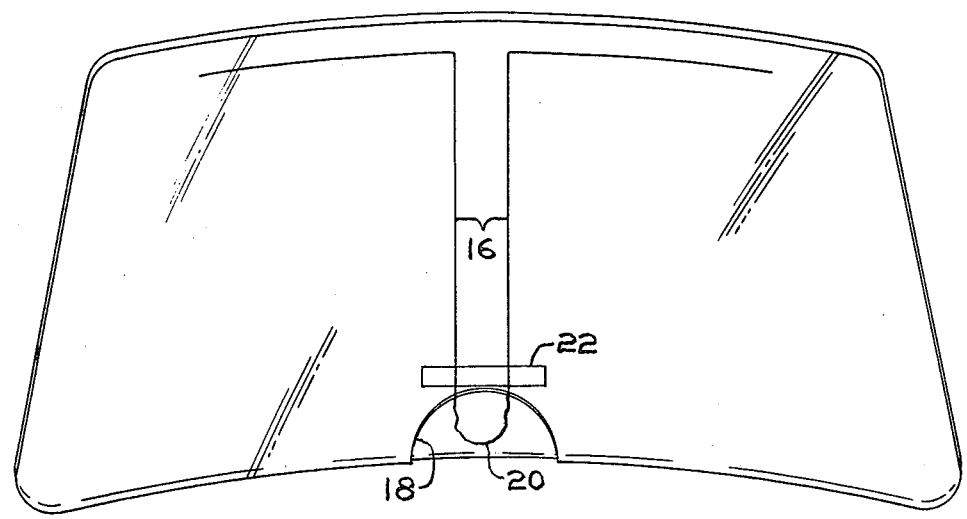
FIG. 1 is a plan view of an assembly of components forming a sandwich to be subsequently prepressed prior to laminating to form a laminated antenna window.
Figure 2:
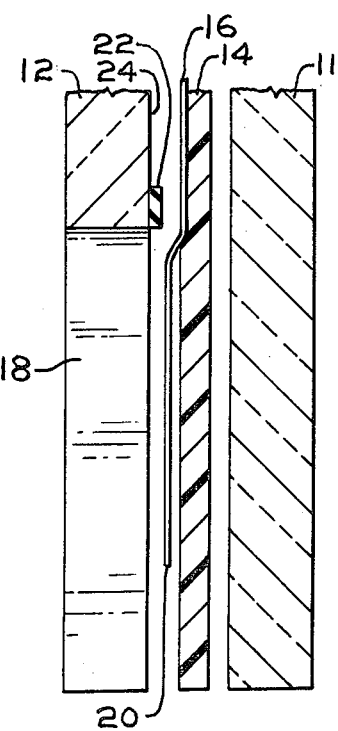
FIG. 2 is an enlarged, exploded view of the important elements of the sandwich of FIG. 1.

A typical laminated antenna windshield comprises a pair of glass sheets 11 and 12 and an interlayer 14 of a thermoplastic material such as polyvinyl butyral or polyurethane, in which is embedded an antenna wire 16. One of the glass sheets 12 is provided with a notched portion 18 to provide access for a marginal portion of the interlayer 14 at the longitudinal center of the lower longitudinal edge of the windshield. The antenna wire 16 contains a looped portion 20 that is later bonded to a metal tab (not shown) as in U.S. Pat. No. 3,638,225 to Zawodniak. The tab is adhered to the portion of the interlayer 14 that faces the notched portion 18 in spaced relation to the margin of the windshield. In the finished antenna windshield, a pig-tail connection (not shown) comprising a wire enclosed in insulating material is in electrical contact with the tab and adapted for connection to a radio receiver. The notched portion 18 is filled with an electrical insulator material (not shown) to support the wire and the tab within the notched portion in spaced relation to the margin of the windshield to avoid grounding contact between the tab or wire and the metal frame of the vehicle which is grounded.

It is understood that either or both of the glass sheets may be replaced by other rigid transparent material such as polycarbonate or acrylic resins.

During the fabrication of the interlayer, the antenna wire embedded within the interlayer 14 extends outward to form the looped portion 20 extending outward from a major surface of the interlayer 14 in the vicinity of the notched portion 18. If properly fabricated and assembled, the antenna wire 16 extends through the major surface of the interlayer at the notched portion 18 so that no part of the antenna wire 16 separates the notched glass sheet 12 from the interlayer 14. Unfortunately, the interlayers are prepared separately from the pair of bent glass sheets before the two glass sheets and the interlayer containing the embedded antenna wire are assembled relative to one another to form a glass-plastic-glass sandwich to be prepressed. Under these circumstances, it is difficult to align the interlayer intermediate the two glass sheets in such manner that the antenna wire is completely embedded within the interlayer 14 except for the interlayer portion facing the notched portion 18. Frequently, when an operator assembles the sandwich, the antenna wire extends outward from the portion of the major surface of the interlayer 14 that faces the notched glass sheet so as to expose a portion of relatively hard wire against the notched glass sheet 12, thereby spacing the latter from the interlayer 14 in the vicinity of the notched portion 18 when the sandwich is assembled.

Under such circumstances, after the sandwich is prepressed either by heating and passing through rolls or by heating the sandwich while evacuating its marginal portion which is encompassed within a fluid impervious, channel-shaped, flexible, tubular member, the wire maintains the notched glass sheet separated from the interlayer along the exposed length of wire.

Therefore, the subsequent final lamination of the sandwich at elevated temperatures in an oil autoclave results in the oil from the autoclave penetrating the interfacial surface between the notched glass sheet and the interlayer sheet along the exposed portion of the wire that extends therebetween instead of inside the interlayer.

This penetration of oil spoiled the optical properties of the laminated antenna windshield and caused it to be scrapped because the customers would not accept windshields with inferior properties and also because such windshields failed to meet the optical standards set by the automotive industry. Early attempts to eliminate this oil penetration during final lamination in the oil autoclave involved the application of a thin elongated strip of material identical to the material of the interlayer. Such application frequently failed to avoid the oil penetration during the final lamination.

According to the present invention, a thin elongated film 22 of a plastic resin having a lower softening point than that of the interlayer material is applied to a surface 24 of the notched glass sheet adjacent the notched portion prior to assembling the two glass sheets at opposite surfaces of the interlayer to form a sandwich to be prepressed.

A suitable material for applying the film is a polyurethane resin tape having a lower heat-softening temperature than that of the polyvinyl butyral interlayer. Tapes 3 millimeters wide, about 35 millimeters long and 0.25 to 0.5 millimeters thick were successfully used. A most preferred mass production technique for applying the film is by extruding the plastic resin through the orifice of a hot melt gun to form the film of lower heat-softening temperature resin slightly laterally inward of the notched portion 18. Either the tape or the plastic extruded through the hot melt gun adheres readily to the glass surface to which it is applied. A particularly suitable apparatus for high speed application of the polyurethane is a Hipermatic 2.5 Model No. 350 hot melt gun sold by Adhesive Machinery Corporation of Seabrook, New Hampshire. The polyurethane was heated to an elevated temperature, as high as 350° F. (176.7° C), to obtain rapid extrusion. The polyurethane cooled rapidly on the glass surface so that it was possible to assemble a sandwich in which the extruded polyurethane was on either the lower surface of the upper glass sheet in the sandwich or on the upper surface of the lower glass sheet of the sandwich to be prepressed.

According to a typical embodiment of the present invention, the notched curved glass sheet was first prepared with the thin elongated film of polyurethane having a low softening point on its surface 24, was disposed on a support with its surface 24 facing upward, the interlayer 14 was approximately aligned over the upper surface of curved glass sheet 12 and another curved glass sheet 11 that was unnotched was mounted in approximate alignment to the upper side of the interlayer 14 to form the sandwich. Excess plastic was trimmed from the margin of the interlayer and the sandwich was supported for prepressing in an oven or tunnel-like furnace, where it was heated to about 150° F. (about 65° C.) and passed between a pair of pressing rolls. The sandwich was then passed through another tunnel-like furnace where it was heated to approximately 190° F. (about 88° C.).

In an alternate operation, the polyurethane film was applied to a notched glass sheet 12, the unnotched curved glass sheet 11 was mounted on a support, the interlayer 14 was draped over the unnotched glass sheet and notched curved glass sheet 12 was mounted over the interlayer with the film facing down. The edge of the sandwich was enclosed in elongated lips of a peripheral channel of flexible synthetic rubber, which covered the notch, for prepressing, the channel was evacuated, first at room temperature and then for about 20 minutes at about 225° F. (107.2° C.) and the channel removed.

After either prepressing operation, a thin metal tab is applied against the exposed portion of the interlayer 14, which faces the notched portion 18 and the looped portion 20 of the antenna wire is soldered to the metal tab and a wire extension known in the trade as a "pigtail" is attached to the metal tab or may be received already attached to the metal tab. The assembly of the sandwich and addition elements is then ready for the final lamination in an oil autoclave at an elevated temperature approximately 275° F. (135° C.), although temperature from about 105° to 130° C. may be utilized.

According to preferred embodiments of the present invention, the assembled sandwich to be laminated into an antenna window comprises two glass sheets, an interlayer 14 of plasticized polyvinyl butyral plasticized with 31 parts of triethylene glycol di(2-ethyl butyrate) per 100 parts of polyvinyl butyral by weight and the barrier film 22 is composed of a polyurethane resin having a lower melting point than the polyvinyl butyral interlayer.

The polyurethane is preferably one consisting essentially of the reaction product of a cycloaliphatic diisocyanate and a relatively low molecular weight hydroxy-terminated aliphatic polyester such as glycol having a number average molecular weight of between about 500 and about 800, most preferably between 520 and 585, and containing no more than about 7 percent by weight of residual unreacted glycol, the mole ratio of diisocyanate to polyester being such that the polyurethane is essentially free of unreacted isocyanate groups. A particularly suitable polyurethane resin consists essentially of polybutylene adipate diol having an average molecular weight of 530 and 4,4' methylene bis cyclohexyl isocyanate (Hylene W) in equal molecular weights, or 66.92 parts by weight of the diol and 33.08 parts by weight of the isocyanate, which also includes less than 0.05 percent, preferably about 0.02 percent, by weight of gamma-glycidoxy-propyltrimethoxysilane (Dow Corning Z-6040) based on the polyurethane, to enhance adhesion. When this sandwich was subjected to prepressing and autoclave treatments enumerated previously, oil from the autoclave did not penetrate the interfacial surface of the sandwich and the final laminated antenna window that resulted.

The form of the invention shown and described herein represents an illustrative preferred embodiment and variations thereof. The invention is not limited for use with a continuous antenna wire having a looped portion, but is also useful in laminated windshields having any other shape of wire antenna, such as two separate dipole elements. Furthermore, the present invention is also useful when final lamination is accomplished in an autoclave containing any fluid medium other than oil, as long as the medium has a tendency to penetrate along the antenna wire between adjacent layers of the laminated windshield. It is understood that various other changes may be made without departing from the gist of the invention as defined in the claimed subject matter which follows.

We claim:

1. A laminated antenna window comprising a pair of relatively rigid sheets of transparent material, a notched portion along the marginal portion of one of said sheets, a thermoplastic organic interlayer bonding said rigid sheets together throughout substantially their entire extent, antenna wire embedded in said interlayer and having a portion extending outward from a major surface of said interlayer in the vicinity of said notched portion, and a film of organic plastic having a lower heat-softening temperature than that of said interlayer and adherent to said antenna wire, said rigid transparent material and said interlayer disposed between said notched rigid sheet and said interlayer in the vicinity of said notched portion, said plastic film being sufficiently thick to prevent fluid penetration along said wire laterally interiorly of said notched portion during the lamination of said laminated antenna window in an oil autoclave.

2. A laminated antenna window as in claim 1, wherein said transparent material is glass.

3. A laminated antenna window as in claim 2, wherein said interlayer is plasticized polyvinyl butyral.

4. A laminated antenna window as in claim 3, wherein said plastic film consists essentially of a polyurethane having a heat-softening temperature below that of said plasticized polyvinyl butyral.

5. A laminated antenna window as in claim 4, wherein said plastic film consists essentially of a polyurethane composition consisting essentially of the reaction product of a cycloaliphatic diisocyanate and a hydroxy-terminated aliphatic glycol having a number average molecular weight between about 500 and 800, containing no more than about 7 percent by weight of residual unreacted glycol, the mole ratio of diisocyanate to polyester being such that the polyurethane is essentially free of unreacted isocyanate groups.

6. A laminated antenna window as in claim 5, wherein said polyurethane composition includes less than 0.05 percent by weight of gamma-glycidoxy-propyltrimethoxysilane based on said polyurethane.

7. In the method of fabricating a laminated antenna window comprising a pair of sheets of rigid transparent material, a notched portion in a marginal portion of one of said sheets, an organic interlayer sheet, antenna wire embedded in said interlayer sheet and having a portion thereof extending from said interlayer sheet into said notched portion wherein said pair of sheets and said interlayer sheet are assembled to form a sandwich and prepressed to remove fluid from the interfacial surfaces of said sandwich and then subjected to heat and pressure in an oil autoclave to complete the lamination of said window, the improvement comprising applying a film of an organic plastic material having a lower heat-softening temperature than said organic interlayer sheet and adherent to said antenna wire, said rigid transparent material and said interlayer sheet to a surface of said notched sheet in the vicinity of said notched portion, assembling said two sheets of rigid transparent material and said interlayer sheet to form a sandwich of aligned sheets in such a manner that said film of plastic material is on a surface of said notched sheet facing said interlayer sheet and said extending portion of said antenna wire, and applying sufficient heat to said sandwich during the prepressing thereof to flow said plastic material around sufficient of said extending portion of said antenna wire to form a dam sufficient to inhibit the inward flow of oil along the length of said antenna wire during the heat and pressure exposure in said oil autoclave.

8. The method as in claim 7, wherein said sheets of rigid transparent material used to assemble said sandwich are glass sheets, said interlayer sheet used to assemble said sandwich is plasticized polyvinyl butyral, and said film of plastic material applied to said notched glass sheet is a polyurethane composition.

9. The method as in claim 8, wherein said polyurethane composition applied to said notched glass sheet consists essentially of the reaction product of a cycloaliphatic diisocyanate and a hydroxy-terminated aliphatic glycol having a number average molecular weight between about 500 and 800, containing no more than 7 percent by weight of unreacted glycol, the mole ratio of diisocyanate and polyester being such that the polyurethane is essentially free of unreacted isocyanate groups.

10. The method as in claim 9, wherein said polyurethane composition applied to said notched glass sheet further includes less than 0.05 percent by weight of gamma-glycidoxy-propyltrimethoxysilane based on said polyurethane.

* * * * *